United States Patent [19]

Strongwater

[11] Patent Number: 4,800,776
[45] Date of Patent: Jan. 31, 1989

[54] STEERING WHEEL COVER

[76] Inventor: Murray Strongwater, 326 Hewlett Neck Rd., Woodmere, N.Y. 11598

[21] Appl. No.: 468,151

[22] Filed: Feb. 22, 1983

[51] Int. Cl.⁴ ............................ B62D 1/06; G05G 1/10
[52] U.S. Cl. ..................................................... 74/558
[58] Field of Search ...................... 74/552, 558, 558.5, 74/551.8, 551.9; 150/52 M, 54 B

[56] References Cited

U.S. PATENT DOCUMENTS

| | | | |
|---|---|---|---|
| 1,391,108 | 9/1921 | Hamblet | 74/558 |
| 1,488,323 | 3/1924 | Dover | 74/558 |
| 1,984,033 | 12/1934 | Ritchie | 74/558 |
| 2,058,740 | 10/1936 | Summers | 74/558 |
| 2,157,950 | 5/1939 | Best | 74/558 |
| 2,491,803 | 12/1949 | Heras et al. | 74/558 |
| 2,618,987 | 11/1952 | Goldstine | 74/558 |
| 3,945,416 | 3/1976 | Rim | 74/558 |
| 4,179,950 | 12/1979 | Valley | 74/558 |

FOREIGN PATENT DOCUMENTS 1199856  1/1986  Canada .................................. 74/558

Primary Examiner—Gary L. Smith
Assistant Examiner—Vinh Luong
Attorney, Agent, or Firm—Henry R. Lerner

[57] ABSTRACT

A cover for an automobile steering wheel for improving the grip on the wheel. An endless annular member is defined by a plurality of discrete elements secured in end to end relation for the major extent of the annular member. These elements define stalls adapted to coact with the fingers of the user's hand for facilitating the gripping of the steering wheel. The elements forming the annular member preferably alternate between stretchable members and non-stretchable members although the annular member could be formed by only non-stretchable members secured in end to end relation.

7 Claims, 2 Drawing Sheets

STEERING WHEEL COVER

BACKGROUND OF THE INVENTION

The present invention relates to covers for an automobile steering wheel.

From the early days of the automobile, the importance of having a good grip upon the steering wheel was clearly recognized because any relative slippage between the driver's hands and the steering wheel results in loss of control which can cause an accident. Such relative slippage between the driver's hands and the steering wheel can occur during normal driving conditions as well as when the car is operated over rough roads causing vibration and sudden movement of the steering wheel.

Steering wheels have always been made of materials such as wood, or plastic, having a hard and smooth finish which has a tendency to reduce the friction between the driver's hands and the steering wheel. Recognizing the danger resulting from slippage between the driver's hands and the steering wheel, automobile manufacturers have provided grooves, ridges or similar indentations on the steering wheel in order to reduce the likelihood of relative slippage. These efforts, however, have been far from successful. As a result the driver, aware of the danger of slippage, is likely to grip the steering wheel very tightly causing muscular discomfort, fatigue and possibly pain.

The above described problems are well known and numerous efforts have been made to solve them. A common solution was the provision of a steering wheel cover made of materials having good frictional and gripping characteristics. Such covers were often made of elastic material so that the steering wheel cover could be stretched in order to fit onto the steering wheel over which it would remain under tension. Examples of such prior art steering wheel covers are shown in U.S. Pat. Nos. 1,446,628, 1,530,060 and 2,172,585.

Such steering wheel covers improved the driver's grip on the wheel to some extent. In addition, these wheel covers could be touched in extreme temperatures, either hot or cold, whereas a conventional steering wheel would almost always be impossible to touch with bare hands.

While the steering wheel covers of the prior art did constitute some advance in dealing with the problems presented by an uncovered steering wheel, there was still much left to be desired in terms of slippage as well as comfort to the driver.

SUMMARY OF THE INVENTION

In accordance with the present invention, there is provided a cover for an automobile steering wheel which constitutes a substantial improvement over prior art steering wheel covers.

The concept underlying the present invention is the realization that a hand comprises a plurality of fingers and that each finger can be made to interact individually with the steering wheel so that the whole becomes greater than the sum of its parts.

It is therefore an object of the invention to provide a steering wheel cover made of a plurality of side-by-side discrete elements, alternately elastic and nonelastic, each of which defines a stall for engagement by a finger of the driver's hand. Thus, when the steering wheel cover in accordance with the invention is grasped by the driver's hands, each of the driver's fingers will engage a finger stall on the steering wheel cover to create its own interaction therewith, collectively defining a far greater grip of the steering wheel by the driver's hands, thereby reducing and virtually eliminating the slippage between the fingers and the steering wheel without requiring the driver to exert more pressure than he is normally used to. Thus, in accordance with the invention, substantial improved gripping characteristics are obtained without subjecting the driver to fatigue, discomfort and pain usually associated with excessive pressure.

In accordance with the invention, the steering wheel cover constitutes an endless annular element formed by securing in side-by-side relation alternate discrete elements of a non-elastic and elastic material. Pursuant to one embodiment of the invention, the non-elastic elements are made of leather and the elastic elements are made of Spandex. Pursuant to another embodiment, the non-elastic element may comprise vinyl and the elastic element may comprise any stretchable material other than Spandex. The elements are secured to each other, in alternating fashion, by stitching in a buttlike manner so that the material adjacent the lines of stitching is doubled up on itself, and stitched in such doubled up condition so as to define at each juncture a peak relative to the adjacent elements. This procedure helps define the stall quality of each element. The endless annular element is provided along its two continuous side edges with channels adapted to receive a continuous rubber band zig zag stitched to the channel under tension. This enables the annular steering wheel cover to be stretched sufficiently to permit it to be placed on the steering wheel where it remains under tension. It is of course understood that when the steering wheel cover is placed on the steering wheel, the elastic elements or stalls are also under tension.

The unique arrangement of alternating side-by-side elastic elements with non-elastic elements is what defines the plurality of individual stalls adapted to interact with the individual fingers so as to provide significantly enhanced gripping characteristics between individual fingers and the steering wheel to collectively define an immensely enhanced overall grip.

In accordance with another embodiment of the invention, the steering wheel cover is defined by an endless annular member made of elastic material such as Spandex to the outer surface of which are stitched individual spaced elements of a non-stretchable material. Thus, the non-stretchable elements are appliqued and overlie the stretchable member. The net result is substantially the same in that the steering wheel cover will still define a plurality of side-by-side stalls alternating between elastic and non-elastic elements to provide the enhanced gripping characteristics intended to be achieved.

DESCRIPTION OF THE PREFERRED EMBODIMENTS OF THE INVENTION

Figure 1:
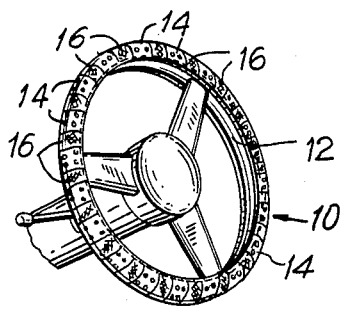
FIG. 1 is an elevational perspective view of a steering wheel cover in accordance with the invention, mounted on an automobile steering wheel.

Referring now to the drawings, reference numeral 10 identifies the steering wheel cover in accordance with the invention as mounted on an automobile steering wheel 12. Steering wheel cover 10 comprises an endless annular member defined by a plurality of discrete elements 14 alternating with a plurality of discrete elements 16, secured to each other to form the endless annular member.

Elements 14 are made of a non-stretchable material such as leather or vinyl and alternating elements 16 are made of stretchable material such as Spandex. Thus, each non-stretchable element 14 is secured inbetween two spaced stretchable elements 16 and each stretchable element 16 is in turn secured between two spaced non-stretchable elements 14.

Figure 4A:
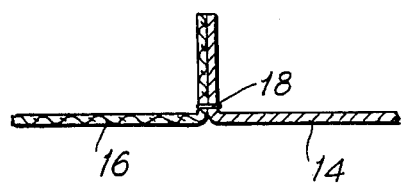
FIG. 4a a sectional view illustrating the first stitching step to secure adjacent elastic and non-elastic elements.
Figure 2:
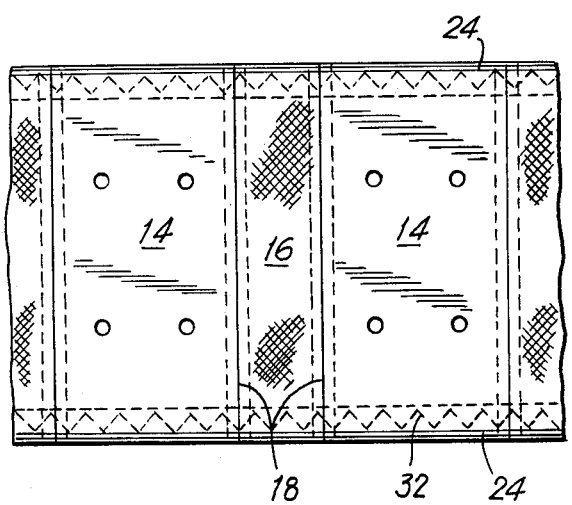
FIG. 2 is a top plan view of a segment of the steering wheel cover, in stretched condition.
Figure 3:
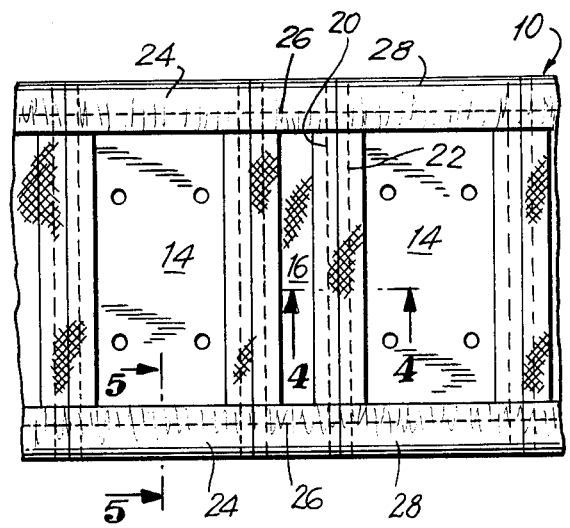
FIG. 3 is a bottom plan view of the segment shown in FIG. 2.
Figure 4B:
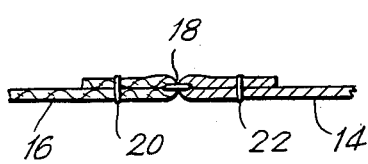
FIG. 4b a sectional view taken along lines 4—4 in FIG. 3.
Figure 5:
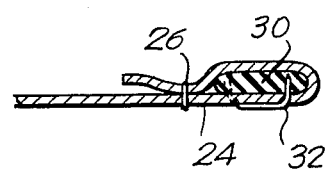
FIG. 5 is a sectional view taken along lines 5—5 of FIG. 3.

Adjacent elements 14 and 16 are preferably secured to each other by stitching. As shown in FIGS. 4a and 4b, elements 14 and 16 are first secured by line of stitching 18 slightly spaced from the respective ends of these elements. Thereafter, the portion of each element beyond the line of stitching 18 is doubled up on itself, and stitched to itself as shown by line of stitching 20 with respect to stretchable element 16 and line of stitching 22 with respect to the non-stretchable element 14. This stitching arrangement provides at each juncture between non-stretchable element 14 and stretchable element 16 a double width joint which defines a slight peak when wheel cover 10 is in place under tension on the steering wheel. These peaks inevitably cause elements 14 and 16 to become valleys so as to define finite stalls for the fingers of the driver's hands. Further, it is the stall characteristic of the elements alternating between stretchable and non-stretchable which provides for each finger a surface with respect to which it can frictionally interact to substantially increase the grip of the driver. It should be noted, however, that the improved grip will be caused by the side-by-side elements, without regard to the specific stitching arrangement or specific securing arrangement. After the endless member has been formed by the securing together alternating elements 14 and 16, the side edges 24 are folded over and stitched along line 26 to define endless channels 28 on both sides of the endless member. Channel 28 contains a continuous elastic longitudinal element 30 such as a rubber band which is stitched under tension to the channel, by zig zag stitching 32 as also seen in FIGS. 3 and 5. This arrangement enables the completed annular member to be stretched sufficiently so that it can be placed over the steering wheel where it remains under tension, with each elastic element 16 also being under tension while functioning as a stall for the driver's fingers. As shown in the drawings, non-stretchable elements 14 are slightly wider than stretchable elements 16, but such dimensional difference is not critical whereby variation in these widths will still produce the intended superior grip.

While alternating stretchable with non-stretchable elements is the preferred embodiment, it must be noted that the invention could also be practiced by having a plurality of non-stretchable elements secured side by side to form the annular element since the non-stretchable elements would still define individual stalls for interacting with the driver's fingers and significantly enhance and improve the grip on the steering wheel. In such embodiment, however, it would be the elastic bands along the side edges of the annular member which would enable the member to be stretched sufficiently to permit it to be placed onto the steering wheel, where it would remain under tension.

Figure 6:
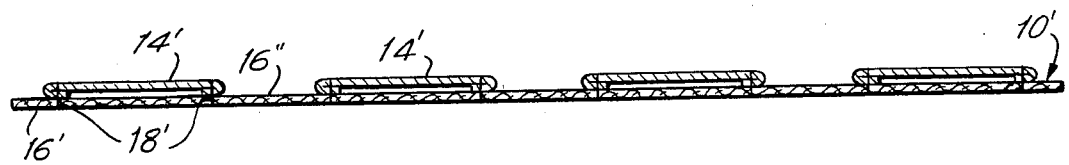
FIG. 6 is a vertical sectional view through the steering wheel cover in accordance with another embodiment of the invention.
Figure 7:
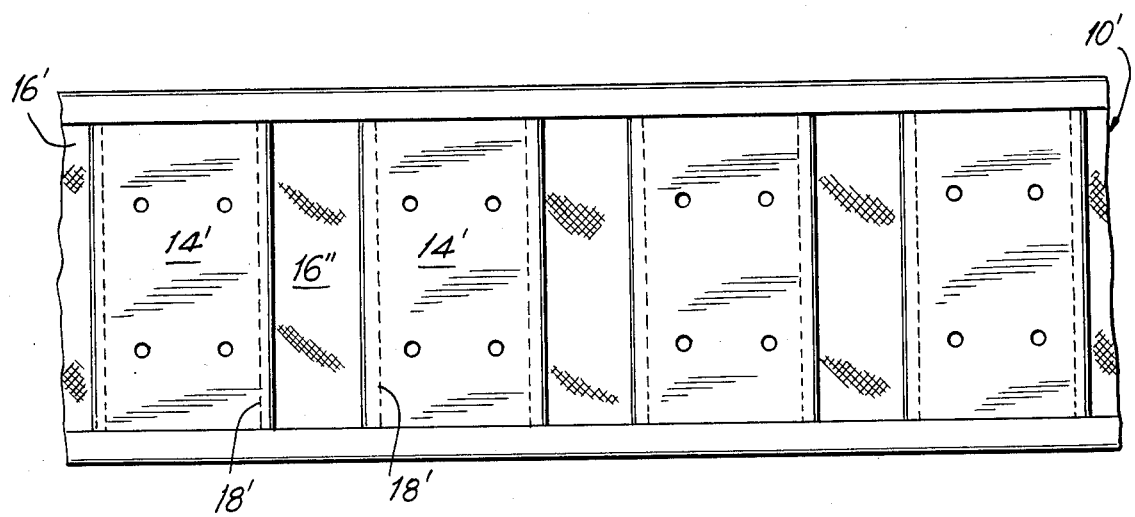
FIG. 7 is a top plan view of the embodiment shown in FIG. 6.

Referring now to FIG. 6, there is shown another embodiment of the invention wherein the annular member 10' consists of an endless elastic section 16' to the upper surface of which are secured a plurality of elements 14' made of non-elastic material such as leather and secured to the underlying elastic member 16' by lines of stitching 18'. Thus, elements 14' are in effect appliqued onto the underlying elastic member 16' in spaced arrangement whereby a stall 16" is defined between each pair of adjacent non-elastic elements 14'. The overall effect of this embodiment is substantially the same as that described in connection with the embodiments of FIGS. 1 through 5 providing an endless annular element having side-by-side alternating sections of elastic and non-elastic elements defining a plurality of stalls for interacting with the driver's fingers and providing a far superior grip of the steering wheel.

While there is herein shown and described the preferred embodiments of the invention, it will be understood that the invention may be embodied otherwise than as herein specifically illustrated or described and that in the illustrated embodiments certain changes in the details of construction and in the form and arrangement of parts may be made without departing from the underlying idea or principles of this invention within the scope of the appended claims.

Having thus described my invention, which I claim and desire to secure by Letters Patent is:

1. A cover adapted to be placed onto a steering wheel for improving the grip of a user's fingers on the cover, comprising;
   (a) an endless annular member defined by elements of stretchable material secured in end to end relation with alternating elements of non-stretchable material for the major extent of said annular member,
   (b) said elements defining stalls comprising depressed regions separated by raised regions, each of said stalls adapted to coact with a finger of the user's hand for facilitating the gripping of said steering wheel,
   (c) each half of said annular member having at least two elements of stretchable material secured in end to end relation with two alternating elements of non-stretchable material to define, for each half, at least four side by side stalls for coacting with four fingers of one the user's hand,
   (d) said annular member being provided along its side edges with an endless elastic band to enable the steering wheel cover to be placed onto the steering wheel under tension.

2. A cover in accordance with claim 1, wherein the elements of non-stretchable material are made of leather.

3. A cover in accordance with claim 2, wherein the elements of stretchable material are made of Spandex.

4. A cover in accordance with claim 1, wherein the elements of non-stretchable material are made of vinyl.

5. A cover in accordance with claim 4, wherein the elements of stretchable material are made of Spandex.

6. A cover in accordance with claim 1, wherein the elements of stretchable material are secured to the elements of non-stretchable material by a line of stitching and wherein the end portions of the elements beyond said line of stitching are doubled over and stitched onto themselves.

7. A cover adapted to be placed onto a steering wheel for improving the grip of a user's fingers on the cover, comprising:
   (a) an endless annular member defined by elements of stretchable material secured in end to end relation with alternating elements of non-stretchable material for the major extent of said annular member,
   (b) said elements defining stalls comprising valleys separated by peaks, each of said stalls adapted to coact with a finger of the user's hand for facilitating the gripping of said steering wheel,
   (c) each half of said annular member having at least two elements of stretchable material secured in end to end relation with two alternating elements of non-stretchable material to define, for each half, at least four side by side stalls for coacting with four fingers of one of the user's hand,
   (d) said annular member being provided along its side edges with an endless elastic band to enable the steering wheel cover to be placed onto the steering wheel under tension.

* * * * *